(12) United States Patent
Wills

(10) Patent No.: US 6,442,310 B1
(45) Date of Patent: Aug. 27, 2002

(54) OPTICAL COUPLING DEVICE AND METHOD

(75) Inventor: Gonzalo Wills, Ottawa (CA)

(73) Assignee: JDS Uniphase Inc., Nepean ( * ) Notice: Subject to any disclaimer, the term of this patent is extended or adjusted under 35 U.S.C. 154(b) by 35 days.

(21) Appl. No.: 09/652,883

(22) Filed: Aug. 31, 2000

Related U.S. Application Data

(60) Provisional application No. 60/218,136, filed on Jul. 14, 2000.

(51) Int. Cl.[7] .................................................. G02B 6/32
(52) U.S. Cl. .......................................... 385/33; 385/31
(58) Field of Search ............................ 385/24, 31, 33, 385/34, 35

(56) References Cited

U.S. PATENT DOCUMENTS

| | | | | |
|---|---|---|---|---|
| 4,737,004 A | | 4/1988 | Amitay et al. ............ 350/96.15 |
| 4,834,484 A | * | 5/1989 | Gorman et al. ........... 350/96.18 |
| 4,844,574 A | * | 7/1989 | Chande ..................... 350/96.18 |
| 5,054,877 A | * | 10/1991 | Ortiz, Jr. et al. ............... 385/33 |
| 5,212,747 A | | 5/1993 | Fink ............................. 385/33 |
| 5,701,373 A | * | 12/1997 | Oleskevich ................... 385/33 |
| 5,883,748 A | | 3/1999 | Shum .......................... 359/819 |
| 5,889,904 A | | 3/1999 | Pan et al. ...................... 385/24 |
| 5,926,593 A | | 7/1999 | Asami et al. .................. 385/34 |
| 5,943,454 A | * | 8/1999 | Aksyuk et al. ................ 385/22 |
| 6,167,174 A | * | 12/2000 | Zhang et al. .................. 385/33 |
| 6,289,152 B1 | * | 9/2001 | Zhang et al. .................. 385/33 |
| 6,307,677 B2 | * | 10/2001 | Cao ............................ 359/497 |

* cited by examiner

Primary Examiner—John D. Lee
Assistant Examiner—Jennifer Doan
(74) Attorney, Agent, or Firm—Neil Teitelbaum

(57) ABSTRACT

An optical coupling device and method is disclosed, wherein two lenses having a non-unitary configuration are positioned between a plurality of input ports and a plurality of output ports having different center-to-center distances. More specifically, the spacing $d_1$ between input ports is fixed and is different in magnitude from the fixed spacing $d_2$ between output ports. Preferably, the two lenses have a common axis and are separated by a distance $d_3$, which is selected in dependence upon the known and fixed spacings, $d_1$ and $d_2$. Advantageously, the disclosed coupling device provides a simple and economical apparatus and method for coupling light between a first plurality of ports having a fixed distance therebetween to a second plurality of ports having a different fixed distance therebetween.

17 Claims, 3 Drawing Sheets

$2\ell_1 = d_1$ $2\ell_2 = d_2$ $d_1 > d_2$

OPTICAL COUPLING DEVICE AND METHOD

This Appln claims benefit of provisional appln No. 60/218,136 Jul. 14, 2000.

FIELD OF THE INVENTION

The instant invention relates to the field of optical telecommunications, and more particularly to optical couplers for use in optical telecommunication systems.

BACKGROUND OF THE INVENTION

An optical coupler is a device that transfers light signals from a plurality of input fibres to a plurality of output fibres. The simplest optical coupler is a four port 2×2 coupler that operates in either a cross or a parallel state.

One example of a conventional 2×2 cross optical coupler uses a pair of adjacent lenses to couple light from a first pair of input ports on one side of the device to a second pair of output ports on an opposite side of the device. The distance between the input ports is the same as the distance between the output ports.

However, in many optical systems the spacing between the input ports and the output ports is not the same. For example, the use of optical components such as twin isolators, polarization beam splitters, circulators, etc. typically results in different core to core distances between pairs of ports through which it is desirable couple. In these instances, mis-alignment results in significant coupling losses.

Prior art coupling devices have attempted to reduce coupling losses by either matching the core to core separation of input and output ports by physically moving them, or alternatively, by compensating for the lateral displacement loss. For example, with respect to the latter the use of thermally expanded cores has been found to make the lateral displacement loss less sensitive and to provide improved optical coupling. However, most of the proposed systems are unnecessarily costly and in many instances inconvenient, if at all feasible.

In fact, there remains a need for an efficient and economical optical coupler that minimizes coupling losses in four or more port systems where the spacing between adjacent pairs of ports is non-uniform.

It is an object of the instant invention to provide a method and device for efficiently providing optical coupling between a plurality of input ports and a plurality of output ports, where the spacing between the input ports is not the same as the spacing between the output ports.

It is a further object of the instant invention to overcome coupling losses normally associated in coupling systems where the spacing between the input ports is not the same as the spacing between the output ports.

SUMMARY OF THE INVENTION

The instant invention provides an optical coupling device and method wherein the spacing between two lenses is varied in a non-unitary configuration for improving optical coupling between two input ports and two output ports having different centre-to-centre distances.

In accordance with the invention, there is provided an optical coupling device comprising:

a first plurality of ports including a first port and a second port having a fixed distance $d_1$ therebetween;

a second plurality of ports including a third port and a fourth port having a fixed distance $d_2$ therebetween optically coupled to the first plurality of ports; and, a first lens and a second lens having a non-unitary configuration disposed between the first and second plurality of ports for guiding a first non-collimated beam of light from the first port to the fourth port and a second non-collimated beam of light from the second port to the third port, the first and second lenses having a predetermined distance $d_3$ therebetween selected in dependence upon the fixed distances $d_1$ and $d_2$ for ensuring that at least one of the first and second non-collimated beams of light emerges from the second lens at an angle to an optical axis thereof, wherein $d_1 \neq d_2$.

In accordance with the invention, there is provided an optical coupling device comprising:

a first pair of ports having a fixed distance $d_1$ therebetween for launching two non-collimated beams of light therein;

a second pair of ports having a fixed distance $d_2$ therebetween optically coupled to the first pair of ports for receiving the two non-collimated beams of light; and, a first lens and a second lens in a non-unitary arrangement disposed between the first and second pair of ports for directing the two non-collimated beams of light to the second pair of ports at an angle relative to each other, the first and second lenses having a fixed distance $d_3$ therebetween selected in dependence upon the fixed distances $d_1$ and $d_2$, wherein $d_1 \neq d_2$.

In accordance with the invention, there is further provided a method of optically coupling light from a first plurality of ports including a first port and a second port having a fixed distance $d_1$ therebetween to a second other plurality of ports including a third port and a fourth port having a fixed distance $d_2$ therebetween, comprising the steps of:

launching a first non-collimated beam of light from the first port towards a first lens having an optical axis;

allowing the first non-collimated beam of light to pass through the first lens and propagate along an optical path traversing the optical axis towards a second lens disposed a distance $d_3$ from the first lens and having a common optical axis therewith;

allowing the first non-collimated beam of light to pass through the second lens and propagate towards the fourth port at an angle to the common optical axis; and, receiving the first non-collimated beam of light at the fourth port.

BRIEF DESCRIPTION OF THE DRAWINGS

Exemplary embodiments of the invention will now be described in conjunction with the drawings, in which.

DETAILED DESCRIPTION

Figure 1:
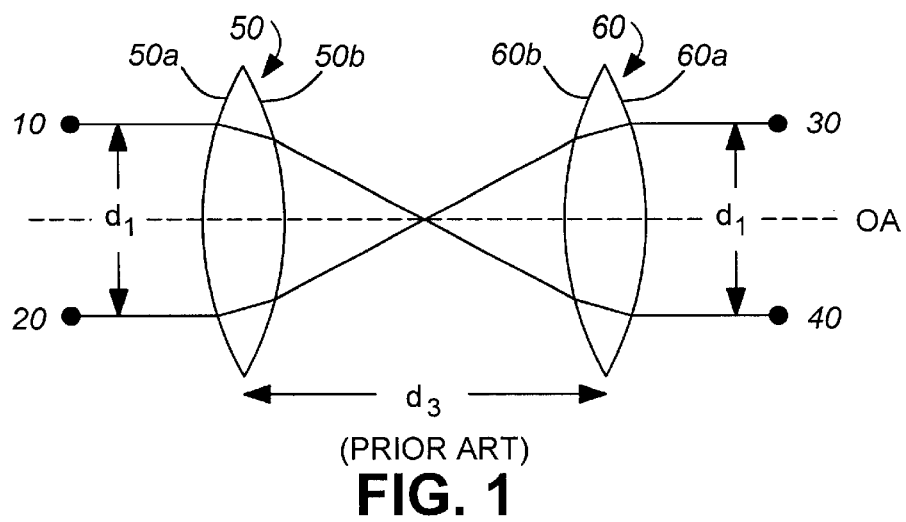
FIG. 1 is a schematic diagram illustrating a prior art coupling system for coupling a first plurality of ports with a second plurality of ports utilising a pair of coaxial lenses.

Referring to FIG. 1 there is shown a conventional 2×2 cross optical coupler, wherein a pair of adjacent lenses 50 and 60 are used to couple light between ports 10 and 40 and between ports 20 and 30. The predetermined spacing between ports 10 and 20 is $d_1$, between ports 30 and 40 is $d_1$, and between lenses 50 and 60 is $d_3$. Preferably, $d_3$ is selected to be about twice the focal length of identical lenses 50 and 60. Lenses 50 and 60 have a common optical axis (OA).

In operation of the conventional coupler, a beam of light, which for exemplary purposes is shown as a single ray of light, is launched from input port 10 towards the lens 50 in a direction parallel to the optical axis (OA) of the lens 50 off the optical axis of the lens 50. The beam of light falls on an upper end of a first face 50a of the lens and is passed therethrough to a second face 50b. The beam of light is transmitted from the upper end of lens 50 towards a lower end of lens 60 at an angle to the optical axis. After passing through the optical axis the beam of light is incident on the lower end of the first face 60b of the second lens 60 and passes therethrough to the second face 60a. Since $d_3$ is about equal to twice the focal length of the lenses 50 and 60, the beam of light exits the lens 60 from the second face 60a in a direction parallel to the optical axis of the lens 50 and is transmitted towards port 40.

Similarly, another beam of light is launched from input port 20 towards the lens 50 in a direction parallel to the optical axis off the optical axis of the lens 50. The beam of light falls on a lower end of the first face 50a of the lens and is passed therethrough to the second face 50b. The beam of light is transmitted from the lower end of lens 50 towards the upper end of lens 60 at an angle to the optical axis. After passing through the optical axis the beam of light is incident on the upper end of the first face 60b of the second lens 60 and passes therethrough to the second face 60a. Since $d_3$ is about equal to twice the focal length of the lenses 50 and 60, the beam of light exits the lens 60 from the second face 60a in a direction parallel to the optical axis of the lens 60 and is transmitted towards port 30.

Figure 2:
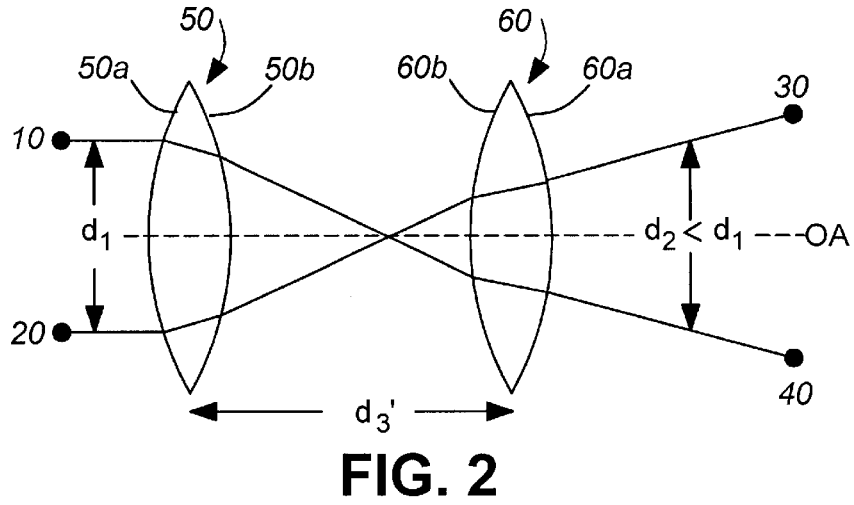
FIG. 2 is a schematic diagram illustrating a coupling system in accordance with the invention, wherein coupling losses are reduced by selecting a predetermined distance between the lenses in dependence upon a fixed distance between the ports.

Referring to FIG. 2, an optical coupling device in accordance with the instant invention is shown. In general, the method and apparatus described with reference to FIG. 1 is similar to FIG. 2. However, in FIG. 2 the spacing $d_1$ between input ports 10 and 20 is no longer equivalent to the spacing $d_2$ between ports 30 and 40. Rather, the spacing $d_1$ between input ports 10 and 20 is greater than the spacing $d_2$ between output ports 30 and 40. Furthermore, the spacing $d_3'$ between the lenses 50 and 60 is less than $d_3$ to compensate for the misalignment. The exact magnitude of $d_3'$ is selected in dependence upon the known and fixed spacings between ports (i.e., $d_1$ and $d_2$) according to methods known to those skilled in the art (e.g., using ray tracing). The lenses 50 and 60, which are preferably collimating/focusing lenses such as aspherical or graded index (GRIN) lenses, provide non-unitary magnification.

In operation, a beam of light, which for exemplary purposes is shown as a single ray of light, is launched from input port 10 towards the lens 50 in a direction parallel to the optical axis (OA) of the lens 50 off the optical axis of the lens 50. The beam of light falls on an upper end of a first face 50a of the lens and is passed therethrough to a second face 50b. The beam of light is transmitted from the upper end of lens 50 towards the lower end of lens 60 at an angle to the optical axis. After passing through the optical axis the beam of light is incident on a lower end of a first face 60b of the second lens 60 and passes therethrough to a second face 60a. Since $d_3$ is less than twice the focal length of lenses 50 and 60, the beam of light is incident on the inward face 60b and exits from the outward face 60a substantially closer to the optical axis of the lens 60 than that illustrated in FIG. 1. The beam of light is transmitted towards output port 40 at a slight angle. The exact angle at which the beam of light emerges is dependent upon the angle from which the beam of light is launched from port 10 relative to the optical axis, the distance between the port 10 and the surface of the lens 50a, the distance from which port 10 is disposed from the optical axis of the lens 50, and of course the distance between the lenses 50 and 60, $d_3'$. These parameters are selected to ensure that the angle is within the acceptance angle of an output optical fibre coupled to port 40. Optionally, each of these parameters is adjustable for improving optical coupling.

Similarly, another beam of light is launched from input port 20 towards the lens 50 in a direction parallel to the optical axis off the optical axis of the lens 50. The beam of light falls on a lower end of the first face 50a of the lens and is passed therethrough to the second face 50b. The beam of light is transmitted from the lower end of lens 50 towards the upper end of lens 60 at an angle to the optical axis. After passing through the optical axis the beam of light is incident on the upper end of the first face 60b of the second lens 60 and passes therethrough to the second face 60a. The beam of light is transmitted towards output port 30 at a slight angle. The exact angle at which the beam of light emerges is dependent upon the angle from which the beam of light is launched from port 20, the distance between the port 20 and the surface of the lens 50a, the distance from which port 20 is disposed from the optical axis of the lens 50, and of course the distance between the lenses 50 and 60, $d_3'$. These parameters are selected to ensure that the angle is within the acceptance angle of an output optical fibre coupled to port 30. Optionally, each of these parameters is adjustable for improving optical coupling. Further optionally, the coupling device is provided with means for moving the lenses 50 and 60 relative to each other for applications to other systems having different fixed distances between adjacent ports and/or for applications to systems having variable distances between adjacent ports.

Figure 3:
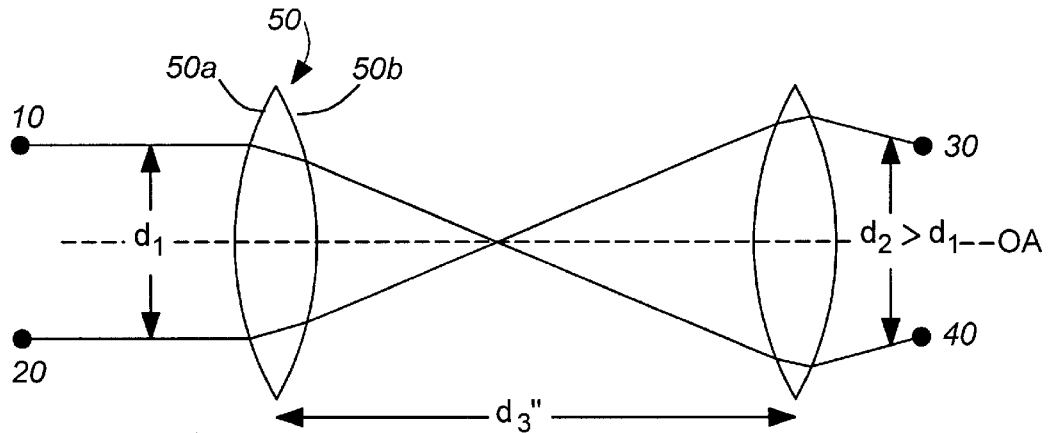
FIG. 3 is a schematic diagram illustrating a coupling system, as shown in FIG. 2, wherein coupling losses are reduced by selecting another predetermined distance between the lenses in dependence upon a different fixed distance between the ports.

FIG. 3 represents another embodiment in accordance with the instant invention. In general, the method and apparatus described with reference to FIG. 2 is similar to FIG. 3. However, in FIG. 3 the spacing $d_1$ between input ports 10 and 20 is less than the spacing $d_2$ between output ports 30 and 40. Furthermore, the spacing $d_3''$ between the lenses 50 and 60 is increased to compensate for the misalignment. The exact magnitude of $d_3''$ is selected in dependence upon the known and fixed spacings between ports (i.e., $d_1$ and $d_2$) according to methods known to those skilled in the art.

In operation, a beam of light, which for exemplary purposes is shown as a single ray of light, is launched from input port 10 towards the lens 50 in a direction parallel to the optical axis (OA) of the lens 50 off the optical axis of the lens 50. The beam of light falls on an upper end of a first face 50a of the lens and is passed therethrough to a second face

50*b*. The beam of light is transmitted from the upper end of lens 50 towards the lower end of lens 60 at an angle to the optical axis. After passing through the optical axis the beam of light is incident on a lower end of a first face 60*b* of the second lens 60 and passes therethrough to a second face 60*a*. Since $d_3$ is more than twice the focal length of lenses 50 and 60, the beam of light is incident on the inward face 60*b* and exits from the outward face 60*a* substantially further from the optical axis of the lens 60 than that illustrated in FIG. 1. The exact region on the outward face 60*a* from which the beam of light exits is dependent upon the value of $d_3''$. The beam of light is transmitted toward output port 40 at a slight angle as described above.

Similarly, another beam of light is launched from input port 20 towards the lens 50 in a direction parallel to the optical axis off the optical axis of the lens 50. The beam of light falls on a lower end of the first face 50*a* of the lens and is passed therethrough to the second face 50*b*. The beam of light is transmitted from the lower end of lens 50 towards the upper end of lens 60 at an angle to the optical axis. After passing through the optical axis the beam of light is incident on the upper end of the first face 60*b* of the second lens 60 and passes therethrough to the second face 60*a*. The beam of light is transmitted towards output port 30 at a slight angle as described above.

In each of the embodiments shown in FIGS. 2 and 3, the slight angle from which the beam of light emerges from the second lens 60 results in coupling losses when the output ports 30 and 40 are coupled to optical waveguides having an axis parallel to the optical axis of the lenses 50 and 60.

Figure 4:
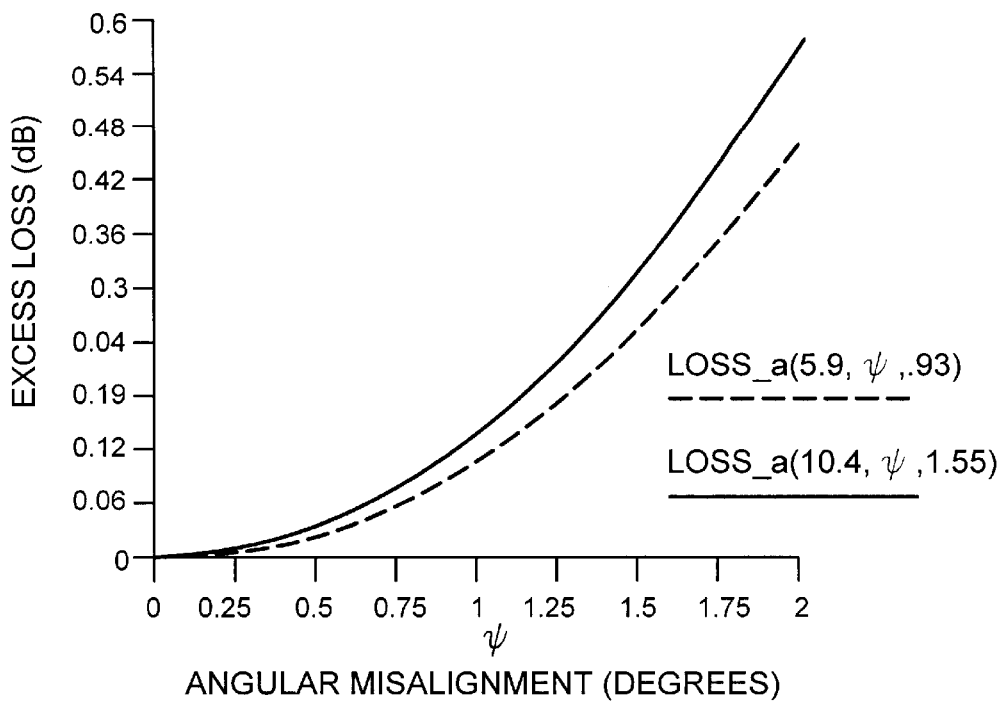
FIG. 4 is a graph illustrating excess loss due to angular misalignment of input and output fibres.
Figure 5:
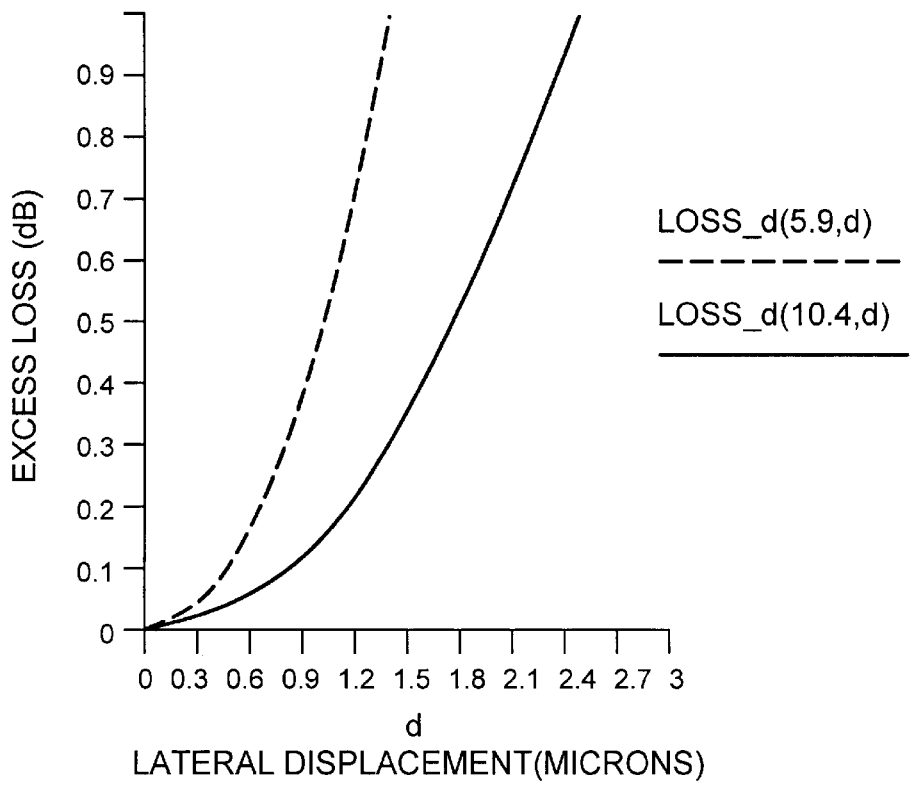
FIG. 5 is a graph illustrating excess coupling loss due to lateral displacement of input and output optical fibres.

However, referring to FIGS. 4 and 5, it is clear that the excess coupling loss due the angular misalignment discussed above is small compared to the excess coupling loss due to lateral misalignment and/or displacement. Accordingly, the instant invention provides improved coupling of light coming from two input ports separated by a given distance to two output ports, which may or may not have the same separation.

The terms "losses due to lateral misalignment" and/or "losses due lateral displacement" as used herein, refer to the optical losses incurred when, for example, a beam of light launched from an input waveguide is not adequately transmitted to a corresponding output waveguide because of the translational misalignment and/or displacement of the output waveguide end with respect to the input waveguide end.

The term "losses due to angular misalignment" as used herein, refers to the optical losses incurred when, for example, a beam of light launched from an input waveguide is not adequately transmitted to a corresponding output waveguide because the beam of light is launched towards the output waveguide end at an angle to the axis of the output waveguide.

The coupling device of the instant invention provides an advantageously simple and economical apparatus and method for coupling light between a first plurality of ports having a fixed distance therebetween to a second plurality of ports having a different fixed distance therebetween.

The instant invention is particularly applicable when coupling light from input/output ports on twin isolators, polarization beam splitters, and/or circulators to input/output optical waveguides in a fixed configuration, such as those in a waveguide block, a multi-groove fibre tube, and/or a multi-bore fibre tube.

For example, the instant invention has provided enhanced coupling between input ports having a core-to-core distance of 124 µm to output ports having a core-to-core distance of 126.8 µm. Furthermore, enhanced coupling has been achieved when using a polarizing beam splitter for coupling light from input ports separated by 122 µm to output ports separated by 125 µm.

Figure 6:
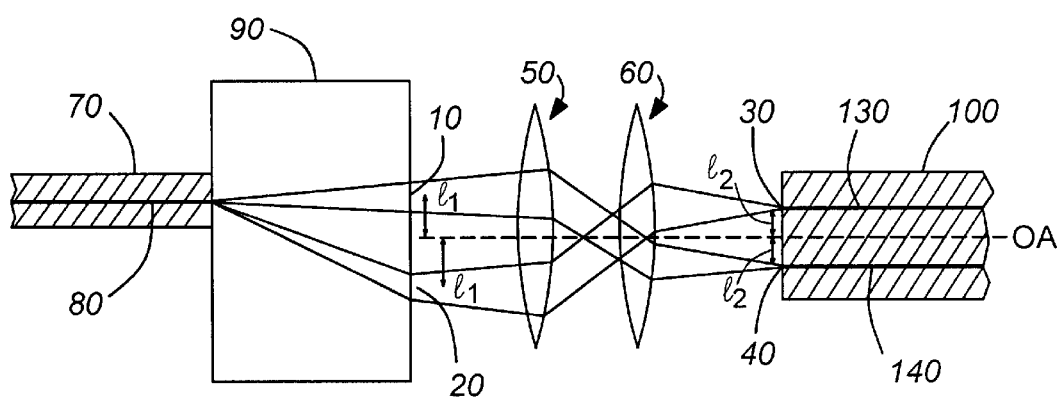
FIG. 6 is a schematic illustration of an optical communication device in accordance with the instant invention including a double fibre tube coupled to a birefringent crystal.

Referring to FIG. 6, an input fibre tube 70 housing an input optical fibre 80 is shown coupled to an end of a birefringent crystal 90, such as a rutile cube. The birefringent crystal 90 separates an input beam of light launched from the input optical fibre 80 into two orthogonally polarized sub-beams of light, which emerge from ports 10 and 20 on an outwardly end of the birefringent crystal and are launched towards lenses 50 and 60. Inherently, ports 10 and 20 have a fixed distance $d_1$ therebetween. On the opposite side of the device a double fibre tube, such as a double bore tube or a double v-groove tube, supports output optical fibres 130 and 140, which are optically coupled to output ports 30 and 40, respectively. Inherently, the output optical fibres 130 and 140 have a fixed a distance $d_1$ therebetween that is smaller than $d_2$. The lenses 50 and 60 are shown having a non-unitary arrangement, such that the two orthogonally polarized beams of light are efficiently coupled to output ports 30 and 40, as described above with reference to FIG. 2.

Of course, numerous other embodiments may be envisaged, without departing from the spirit and scope of the invention. For example, the lenses 50 and 60 do not need to share a common optical axis, the input ports may be non-equidistant from the optical axis of the input lens, the output ports may be non-equidistant from the optical aixs of the output lens, the input beam of light may be launched towards input lens 50 at an angle to the optical axis thereof, and/or the coupling device may be operated in the reverse direction. Optionally, the distance between the first and second lens is adjustable for use with a plurality of optical systems.

What is claimed is:

1. An optical coupling device comprising:
a first plurality of ports including a first port and a second port having a fixed distance $d_1$ therebetween;
a second plurality of ports including a third port and a fourth port having a fixed distance $d_2$ therebetween optically coupled to the first plurality of ports; and,
a first lens and a second lens having a non-unitary configuration disposed between the first and second plurality of ports for guiding a first non-collimated beam of light from the first port to the fourth port and a second non-collimated beam of light from the second port to the third port, the first and second lenses having each a focal length and a predetermined distance $d_3$ therebetween selected in dependence upon the fixed distances $d_1$ and $d_2$ and different than the sum of the focal lengths of said lenses whereby at least one of the first and second non-collimated beams of light emerges from the second lens at an angle to an optical axis thereof, wherein $d_1 \neq d_2$.

2. An optical coupling device as defined in claim 1, wherein the third and the fourth ports comprise optical waveguide ends.

3. An optical coupling device as defined in claim 2, wherein the first and second ports are disposed on at least one of a polarizing beam splitter, a twin isolator, and a circulator.

4. An optical coupling device as defined in claim 3, wherein the first and second lenses have a common optical axis.

5. An optical coupling device as defined in claim 4, wherein each of the first and second ports are offset from the common optical axis by a distance $l_1$, wherein $d_1 = 2l_1$.

6. An optical coupling device as defined in claim 5, wherein each of the third and fourth ports are offset from the common optical axis by a distance $l_2$, wherein $d_2=2l_2$.

7. An optical coupling device as defined in claim 6, wherein $d_2<d_1$.

8. An optical coupling device as defined in claim 6, wherein $d_2>d_1$.

9. An optical coupling device as defined in claim 6, wherein the first and second lenses are movable relative to each other for selectively varying the distance $d_3$.

10. An optical coupling device as defined in claim 6, wherein the optical waveguide ends are defined by an optical waveguide block.

11. An optical coupling device as defined in claim 10, wherein the first and second ports are defined by a birefringent crystal.

12. An optical coupling device as defined in claim 6, wherein the optical waveguide ends are optical fibre ends supported by a double fibre tube.

13. An optical coupling device as defined in claim 6, wherein the first and second ports are defined by a birefringent crystal.

14. An optical coupling device comprising:
    a first pair of ports having a fixed distance $d_1$ therebetween for launching two non-collimated beams of light therein;
    a second pair of ports having a fixed distance $d_2$ therebetween optically coupled to the first pair of ports for receiving the two non-collimated beams of light; and,
    a first lens and a second lens in a non-unitary arrangement disposed between the first and second pair of ports for directing the two non-collimated beams of light to the second pair of ports at an angle relative to each other, the first and second lenses having each a focal length and a fixed distance $d_3$ therebetween selected in dependence upon the fixed distances $d_1$ and $d_2$, wherein $d_1 \neq d_2$ and the distance $d_3$ is different than the sum of the focal lengths of the lenses.

15. A method of optically coupling light from a first plurality of ports including a first port and a second port having a fixed distance $d_1$ therebetween to a second other plurality of ports including a third port and a fourth port having a fixed distance $d_2$ therebetween, comprising the steps of:
    launching a first non-collimated beam of light from the first port towards a first lens having an optical axis and a focal length;
    allowing the first non-collimated beam of light to pass through the first lens and propagate along an optical path traversing the optical axis towards a second lens having a focal length, disposed a distance $d_3$ from the first lens and having a common optical axis therewith, the distance $d_3$ being different than the sum of the focal lengths of the first and second lens;
    allowing the first non-collimated beam of light to pass through the second lens and propagate towards the fourth port at an angle to the common optical axis; and,
    receiving the first non-collimated beam of light at the fourth port.

16. A method of optically coupling light as defined in claim 15 further comprising the steps of:
    launching a second non-collimated beam of light from the second port towards the first lens;
    allowing the second non-collimated beam of light to pass through the first lens and propagate along another different optical path traversing the optical axis towards the second lens;
    allowing the second non-collimated beam of light to pass through the second lens and propagate towards the third port at an angle to the common optical axis; and,
    receiving the second non-collimated beam of light at the third port.

17. A method of optically coupling light as defined in claim 16, further comprising the steps of:
    adjusting the distance $d_3$ for enhancing coupling efficiency between the first and the second plurality of ports.

* * * * *